(12) United States Patent
Kinslow et al.

(10) Patent No.: US 7,651,171 B2
(45) Date of Patent: Jan. 26, 2010

(54) WHEEL CENTER CAP WITH RADIAL LOCK

(75) Inventors: Kenneth A. Kinslow, Macomb, MI (US); Jack H. Preston, Imlay City, MI (US); Trevor L. Enge, West Bloomfield, MI (US); Edward G. Bajek, Farmington, MI (US); Paul J. Leibold, Brighton, MI (US); Dave Slone, Capac, MI (US); Eric Krupitzer, Troy, MI (US)

(73) Assignee: Chrysler Group LLC, Auburn Hills, MI (US)

( * ) Notice: Subject to any disclaimer, the term of this patent is extended or adjusted under 35 U.S.C. 154(b) by 147 days.

(21) Appl. No.: 11/778,119

(22) Filed: Jul. 16, 2007

(65) Prior Publication Data

US 2009/0021071 A1    Jan. 22, 2009

(51) Int. Cl.
*B60B 7/04*    (2006.01)
(52) U.S. Cl. ............ 301/37.31; 301/37.35; 301/37.106; 301/108.1
(58) Field of Classification Search ............ 301/37.101, 301/37.102, 37.21, 37.26, 37.27, 37.31, 37.32, 301/37.33, 37.42, 37.106, 108.1, 108.3
See application file for complete search history.

(56) References Cited

U.S. PATENT DOCUMENTS

| 4,040,672 | A | * | 8/1977 | Imahashi | 301/108.3 |
| 4,818,032 | A | * | 4/1989 | Thomas | 301/37.21 |
| 4,986,606 | A | * | 1/1991 | Thomas | 301/108.1 |
| 6,857,708 | B2 | * | 2/2005 | Hartl et al. | 301/37.102 |
| 7,416,260 | B1 | * | 8/2008 | Cuevas et al. | 301/37.43 |

FOREIGN PATENT DOCUMENTS

EP    185102 A1  *  6/1986

* cited by examiner

*Primary Examiner*—Russell D Stormer
(74) *Attorney, Agent, or Firm*—Ralph E. Smith

(57) ABSTRACT

A cap assembly for a wheel including a cup-shaped cap member having a plurality of annular ridges disposed around a circumference thereof, and a retainer ring having a plurality of axially extending flange portions disposed around a circumference thereof. The retainer ring is slidably coupled to the cup-shaped member, the axially extending flange portions are angled relative to a position normal to the ring, and the plurality of axially extending flange portions correspond to the plurality of annular ridges. When the cap assembly is inserted into the wheel, the retainer ring slides along the cup-shaped member and the annular ridges force the axially extending flange portions to the position normal to the ring to attach the flange portions to the wheel.

16 Claims, 4 Drawing Sheets

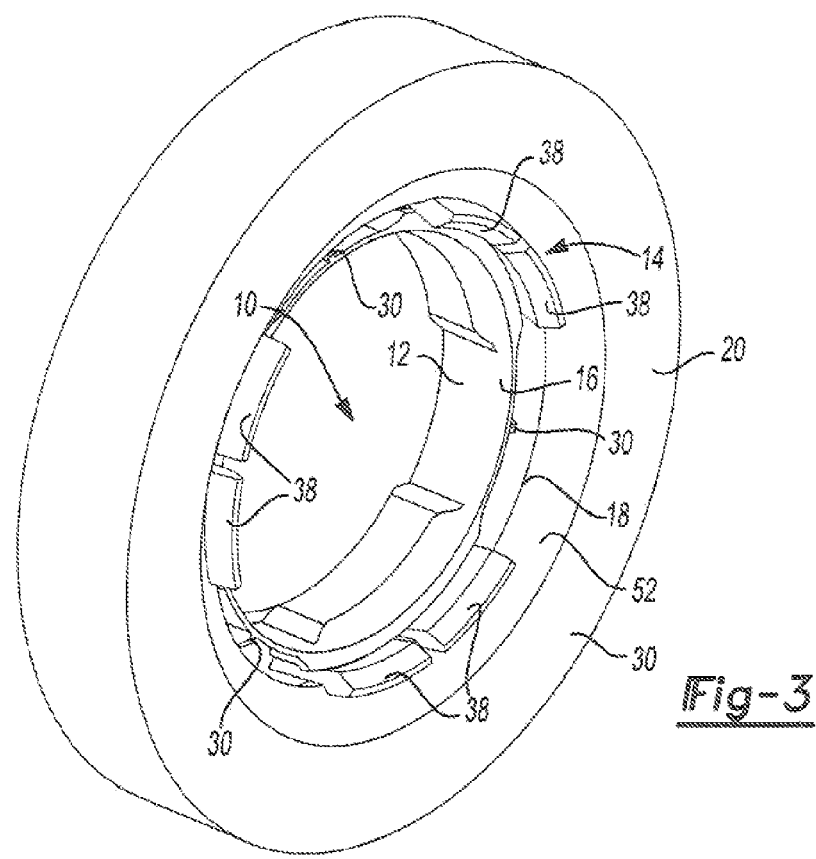
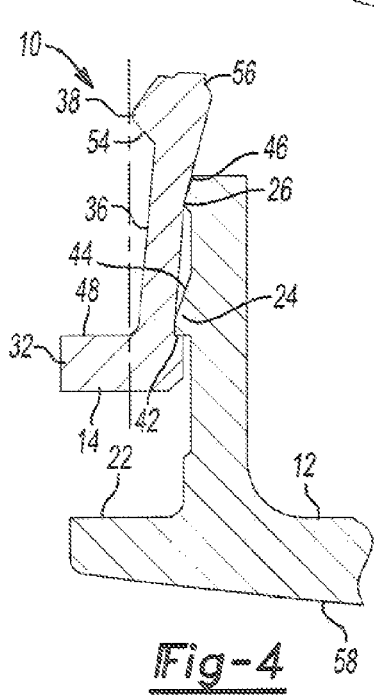
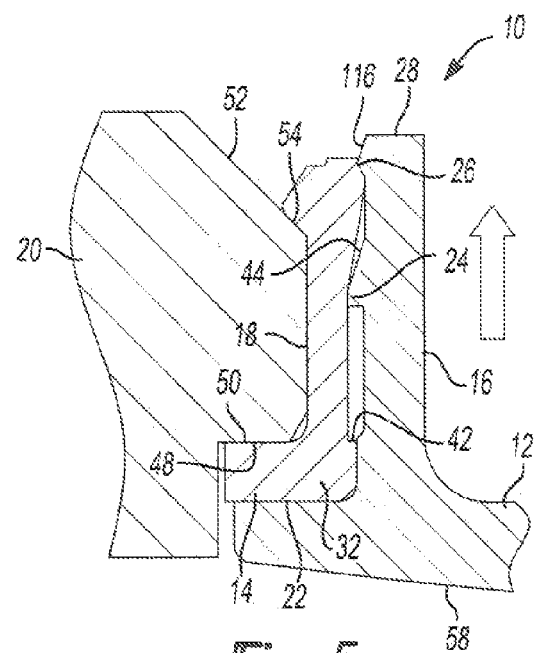

WHEEL CENTER CAP WITH RADIAL LOCK

FIELD

The present teachings relate to a wheel cap having a locking mechanism.

BACKGROUND

Wheel cap assemblies may be used to cover the center hole of a wheel or to hide lug nuts that are used to secure a wheel to a motor vehicle. In addition to covering the center hole or hiding the lug nuts, wheel cap assemblies provide an ornamental or decorative feature to the wheels of a motor vehicle. In this regard, the wheel cap assembly may be provided with a company logo or emblem, or simply be provided with a design that may enhance an appearance of the wheel. Wheel cap assemblies, however, may be removed from the wheel easily for servicing. Accordingly, wheel cap assemblies may be stolen or fall off during operation of the motor vehicle.

SUMMARY

A cap assembly for a wheel including a cup-shaped cap member having a plurality of annular ridges disposed around a circumference thereof, and a retainer ring having a plurality of axially extending flange portions disposed around a circumference thereof. The retainer ring is slidably coupled to the cup-shaped member, the axially extending flange portions are angled relative to a position normal to the ring, and the plurality of axially extending flange portions correspond to the plurality of annular ridges. When the cap assembly is inserted into the wheel, the retainer ring slides along the cup-shaped cap member and the annular ridges force the axially extending flange portions to the position normal to the ring to attach the flange portions to the wheel.

Further areas of applicability of the present teachings will become apparent from the detailed description provided hereinafter. It should be understood that the detailed description and specific examples are intended for purposes of illustration only and are not intended to limit the scope of the present teachings.

DRAWINGS

The present teachings will become more fully understood from the detailed description and the accompanying drawings, wherein:

FIG. 3 is a perspective view of the wheel cap assembly shown in FIG. 1 inserted into a wheel;

FIG. 4 is a cross-sectional view of a wheel cap assembly according to an aspect of the present teachings;

FIG. 5 is a cross-sectional view of a wheel cap assembly inserted into a wheel;

DETAILED DESCRIPTION

The following description of the preferred embodiment(s) is merely exemplary in nature and is in no way intended to limit the invention, its application, or uses.

Figure 1:
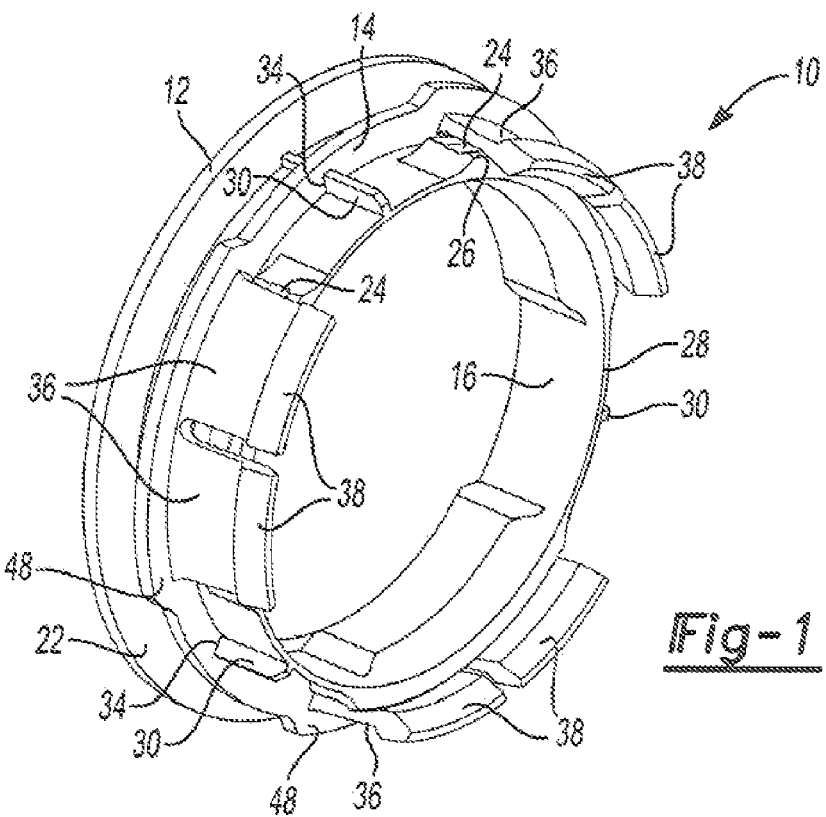
FIG. 1 is a perspective view of a wheel cap assembly according to an aspect of the present teachings.
Figure 2:
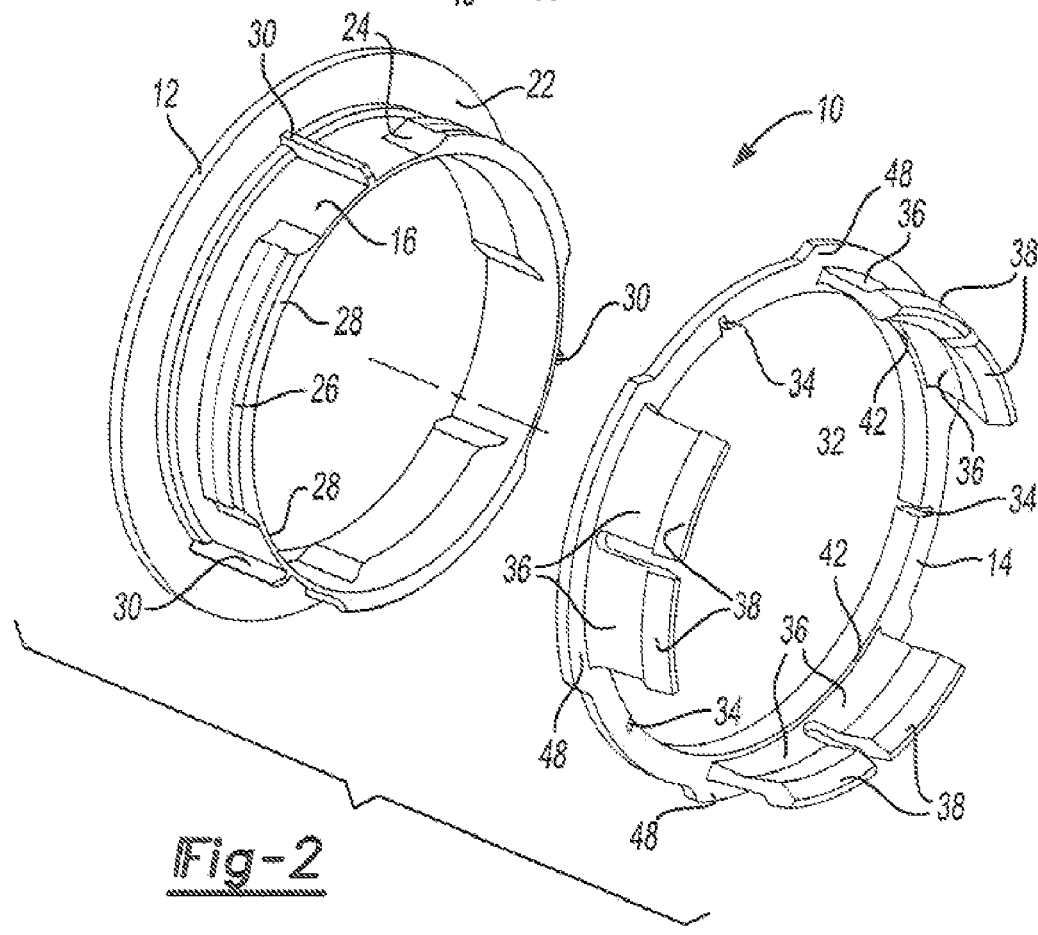
FIG. 2 is an exploded view of the wheel cap assembly shown in FIG. 1.
Figure 6:
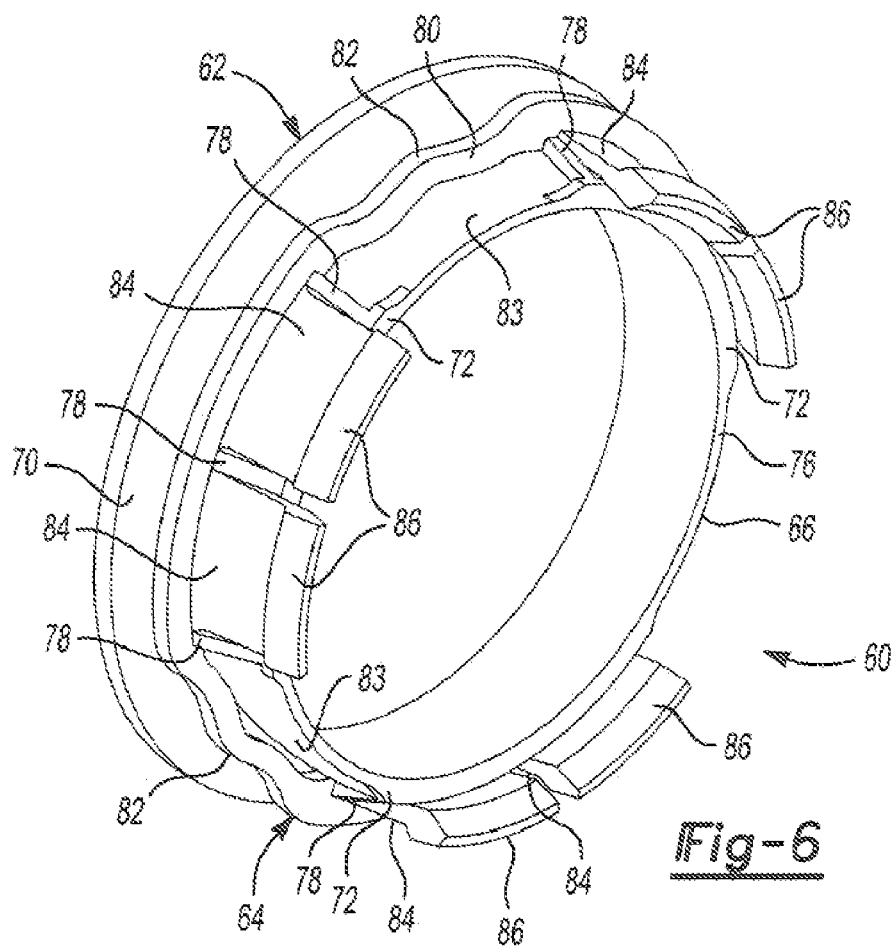
FIG. 6 is a perspective view of a wheel cap assembly according to an aspect of the present teachings.
Figure 7:
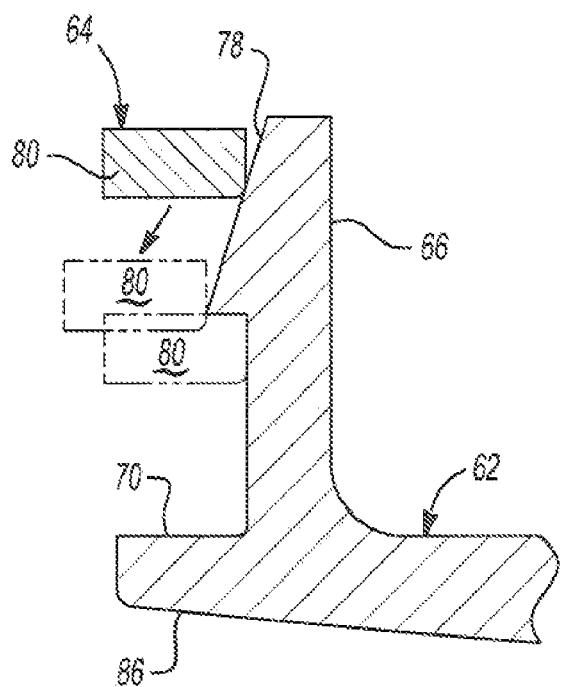
FIG. 7 is a cross-sectional view illustrating assembly of a wheel cap assembly.
Figure 8:
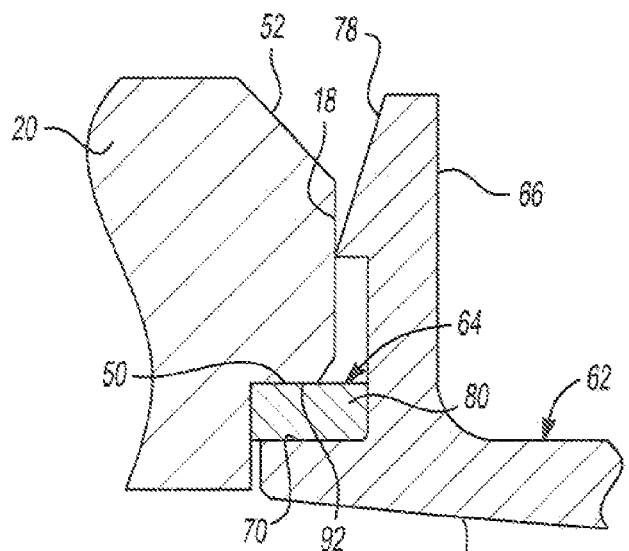
FIG. 8 is a cross-sectional view of a wheel cap assembly inserted into a wheel.

In FIGS. 1 to 3, a wheel cap assembly 10 may include a cap member 12 and a retainer 14 that is slidably coupled to cap member 12. Cap member 12 may be generally a cup-shaped housing having a cylindrical portion 16 that may be inserted into an aperture 18 (FIG. 3) of a wheel 20 and an annular flange 22 that surrounds cylindrical portion 16. Cylindrical portion 16 may include an annular ridge 24 having a lip 26 at a first end 28 thereof, as well as a plurality of guide members 30 disposed intermittently around a circumference of cylindrical portion 16. Annular ridge 24, lip 26, and guide members 30 may be integral with cap member 12 or separate components that may be bonded to cap member 12 in any manner known to one skilled in the art.

Although annular ridges 24 and lips 26 are disposed at 120° intervals in the figures, it should be understood that a single annular ridge 24 and lip 26 that travels around an entire circumference of cylindrical portion 16 may be utilized without departing from the spirit and scope of the present teachings. Furthermore, annular ridges 24 and lips 26 need not be disposed at 120° intervals around cylindrical member 16, but may be disposed at intervals of 90°, 60°, 45°, 30° or any other interval desired. Annular ridges 24 and lips 26 disposed in intervals, however, reduce the amount of material needed to produce cap member 12 and, therefore, reduce manufacturing costs.

Retainer 14 may include an annular ring 32 slidably coupled to cylindrical portion 16 of cap member 12. To properly align retainer 14 with cap member 12, retainer 14 may be provided with notches 34 that correspond to guide members 30. At intervals of retainer annular ring 32 that may correspond to intervals of cap member 12 that have annular ridges 24 and lips 26, retainer 14 may be provided with flange portions 36 that extend axially relative to annular flange 22 of cap member 12. Guide members 30 and notches 34 prevent rotation of retainer 14 relative to cap member 12 so that flange portions 36 correspond to annular ridges 24 and lips 26. Flange portions 36 may include a tab 38 at an end thereof. Although flange portions 36 may be disposed around annular ring 32 at intervals that correspond with intervals of cap member 12 that have annular ridges 24 and lips 26, it should be understood that flange portions 36 may be disposed around an entire circumference of annular ring 32 without departing from the spirit and scope of the present teachings.

Cap member 12 and retainer 14 may be formed of any material that is rigid and able to withstand exposure to the environment. In this regard, the cap member 12 and retainer 14 may be formed of plastic, aluminum, steel or any other material that is formable. When cap member 12 and retainer 14 are formed of a plastic material, wheel cap assembly 10 may be a corrosion resistant assembly because metal-to-metal contact between wheel 20 and cap assembly 10 is avoided. Since metal-to-metal contact is avoided, galvanic corrosion may be prevented.

To couple retainer 14 to cap member 12, notches 34 are aligned with guide members 30 and retainer 14 is slidably forced over cylindrical member 16 of cap member 12. Once retainer 14 is forced over cylindrical member 16, retainer 14 is prevented from disengaging from cap member 12 because retainer 14 may include a shoulder 42 having a outer diameter that is greater than an outer diameter of annular ridge 24. Retainer 14, however, is slidably movable relative to cap member 12 when cap assembly 10 is in an un-installed state.

Referring to FIG. 4, when cap assembly 10 is in an un-installed state, flange portions 36 of annular ring 32 are slightly angled relative to a position normal to annular ring 32. To accommodate the angled orientation of flange portions 36, annular ridge 24 and lip 26 include surfaces 44 and 46 that are acutely angled towards cylindrical member 16 of cap member 12.

To install cap assembly 10, cap member 12 and retainer 14 are pressed into wheel 20. As cap assembly 10 is pressed into wheel 20, a shoulder 48 of ring 32 abuts a corresponding annular shoulder 50 of wheel 20. Retainer 14 is then forced to slide along cylindrical portion 16 of cap member 12 until it abuts annular flange 22. As retainer 14 slides along cylindrical portion 16, ridge 24 forces angled flange portion 36 outward to a position substantially normal to shoulder 48. As angled flange portions 36 are forced outward, tabs 38 abut a sidewall 52 of wheel aperture 18. Tab 38 may include a first contour 54 that corresponds to sidewall 52 of aperture 18, as well as a second contour 56 that corresponds to lip 26. Once cap assembly 10 is fully installed into wheel 20, lip 26 engages contour 56.

Engagement of sidewall 52 with first contour 54 and engagement of lip 26 with second contour 56 ensure that cap assembly 10 is secured in aperture 18 of wheel 20. Ridge 24 also provides a force against angled flange portions 36 that ensures that angled flange portions 36 remain in a position substantially normal to shoulder 48. Due to ridge 24 providing a force against angled flange portions 36, tab 38 serves as a radial lock for cap assembly 10 that reliably secures cap assembly 10 to wheel 20.

As tab 38 serves as a radial lock for cap assembly 10, cap assembly 10 may be extremely difficult to remove from wheel 20 when wheel 20 is attached to a motor vehicle. This difficulty in removing cap assembly 10 may prevent or minimize theft of cap assembly 10, as well as prevent or minimize the risk of cap assembly 10 disengaging from wheel 20 during operation of the motor vehicle. To remove wheel cap assembly 10 when cap assembly 10 covers the center hole (i.e., aperture 18) of wheel 20, wheel 20 may be removed from the motor vehicle so that cylindrical portion 16 and tab 38 may be reached. Then, a tool such as a screwdriver or some other type of device may be used to force cylindrical portion 16 away from flange portion 36. Wheel cap assembly 10 may then be forced out from wheel 20.

To remove cap assembly 10 when cap assembly 10 hides the lug nuts (not shown) used to attach wheel 20 to a motor vehicle (i.e., when lug nuts are disposed within aperture 18), a pry off tool such as provided on a lug nut wrench supplied with the vehicle or some other type of device may be used to force cap portion 22 away from flange portion 14 between tab portions 18. Once cylindrical portion 16 is forced away from flange portion 36, flange portion 36 may return to an angled position such that tab 38 disengages from sidewall 52. Cap assembly 10 may then be removed from wheel 20. Although not illustrated in the figures, it should be understood that an outer surface 58 of cap member 12 may be provided with a design, emblem, or logo that may be integral with cap member 12. Alternatively, outer surface 58 may be provided with a recess that enables a design, emblem, or logo to be secured or fastened to cap member 12.

Now referring to FIGS. 6-10, a wheel cap assembly 60 may include a cap member 62 and a retainer 64 that is slidably coupled to cap member 62. Cap member 62 may be generally a cup-shaped housing having a cylindrical portion 66 that may be inserted into aperture 18 (FIGS. 5-10) of wheel 20 and an annular flange 70 that surrounds cylindrical portion 66. Cylindrical portion 66 may include an annular ridge 72 at a first end 76 thereof, as well as a plurality of guide members 78 disposed intermittently around a circumference of cylindrical portion 66. Annular ridge 72, and guide members 78 may be integral with cap member 62 or separate components that may be bonded to cap member 62 in any manner known to one skilled in the art.

Although annular ridges 72 are disposed at 120° intervals in the figures, it should be understood that a single annular ridge 72 that travels around an entire circumference of cylindrical portion 66 may be utilized without departing from the spirit and scope of the present teachings. Furthermore, annular ridges 72 need not be disposed at 120° intervals around cylindrical member 66, but may be disposed at intervals of 90°, 60°, 45°, 30° or any other interval desired. Annular ridges 72 disposed in intervals, however, reduce the amount of material needed to produce cap member 62 and, therefore, reduce manufacturing costs.

Retainer 64 may include an annular ring 80 slidably coupled to cylindrical portion 66 of cap member 62. To properly align retainer 64 with cap member 22, retainer 64 may be provided with contours 82 that correspond to regions 83 between guide members 78. At intervals of retainer annular ring 80 that may correspond to intervals of cap member 62 that have annular ridges 72, retainer 64 may be provided with flange portions 84 that extend axially relative to annular flange 70 of cap member 62. Flange portions 84 fit between guide members 78. Contours 82 and guide members 78 prevent rotation of retainer 64 relative to cap member 62 so that flange portions 8 correspond to annular ridges 72. Flange portions 84 may include a tab 86 at an end thereof. Although flange portions 84 may be disposed around annular ring 80 at intervals that correspond with intervals of cap member 62 that have annular ridges 72, it should be understood that flange portions 84 may be disposed around an entire circumference of annular ring 80 without departing from the spirit and scope of the present teachings.

Still referring to FIGS. 6-10, cap member 62 and retainer 64 may be formed of any material that is rigid and able to withstand exposure to the environment. In this regard, the cap member 62 and retainer 64 may be formed of plastic, aluminum, steel or any other material that is formable. When cap member 62 and retainer 64 are formed of a plastic material, wheel cap assembly 60 may be a corrosion resistant assembly because metal-to-metal contact between wheel 20 and cap assembly 60 is avoided. Since metal-to-metal contact is avoided, galvanic corrosion may be prevented.

Still referring to FIGS. 6-10, to couple retainer 64 to cap member 62, contours 82 are aligned with regions 83 and retainer 64 is slidably forced over cylindrical member 66 of cap member 62. Once retainer 64 is forced over cylindrical member 66, retainer 64 is prevented from disengaging from cap member 62 because guide members 75 are wedge-shaped. Guide members 75 prevent annular ring 80 from disengaging from cap member 62. Retainer 64, however, is slidably movable relative to cap member 62 when cap assembly 60 is in an un-installed state.

Figure 9:
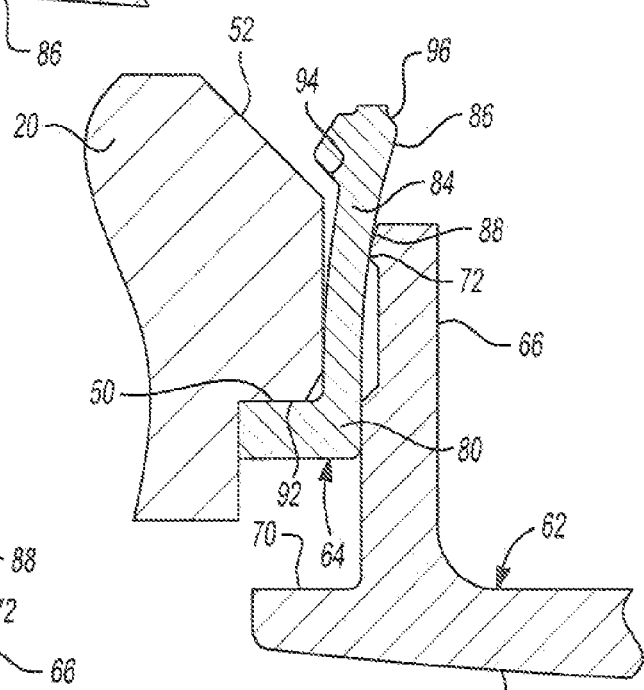
FIG. 9 is a cross-sectional view of a wheel cap assembly being inserted into a wheel.
Figure 10:
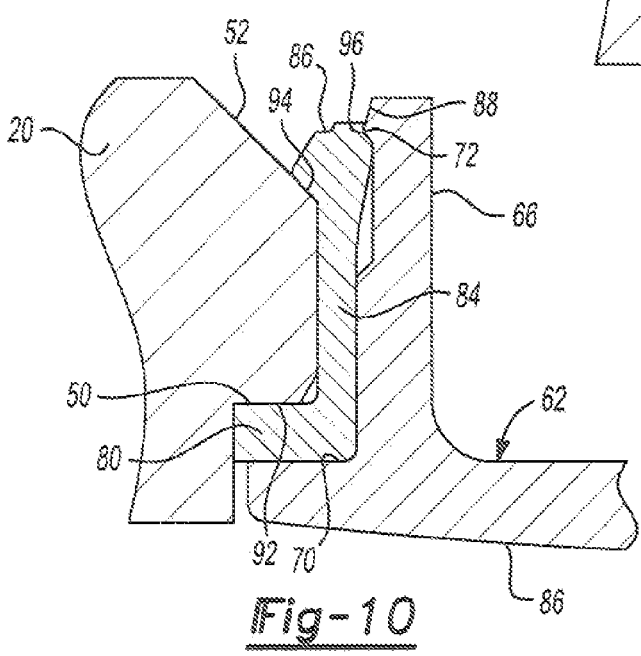
FIG. 10 is a cross-sectional view of a wheel cap assembly inserted into a wheel.

Referring to FIG. 9, when cap assembly 60 is in an un-installer state, flange portions 84 of annular ring 80 are slightly angled relative to a position normal to annular ring 80. To accommodate the angled orientation of flange portions 84, annular ridge 72 includes a surface 88 that is acutely angled towards cylindrical member 66 of cap member 62.

To install cap assembly 60, cap member 60 and retainer 64 are pressed into wheel 20. As cap assembly 60 is pressed into wheel 20, a shoulder 92 of ring 80 abuts a corresponding annular shoulder 50 of wheel 20. Retainer 64 is then forced to slide along cylindrical portion 66 of cap member 62 until it abuts annular flange 70. As retainer 64 slides along cylindrical portion 66, ridge 72 forces angled flange portion 84 outward to a position substantially normal to shoulder 92. As angled flange portions 84 are forced outward, tabs 86 abut a sidewall 52 of wheel aperture 18. Tab 86 may include a first contour 94 that corresponds to sidewall 52 of aperture 18, as well as a second contour 96 that corresponds to ridge 72. Once cap assembly 60 is fully installed into wheel 20, ridge 72 engages contour 96.

Engagement of sidewall 52 with first contour 94 and engagement of ridge 72 with second contour 96 ensure that cap assembly 60 is secured in aperture 18 of wheel 20. Ridge 72 also provides a force against angled flange portions 84 that ensures that angled flange portions 84 remain in a position substantially normal to shoulder 92. Due to ridge 72 providing a force against angled flange portions 84, tab 66 serves as a radial lock for cap assembly 60 that reliably secures cap assembly 60 to wheel 20.

As tab 86 serves as a radial lock for cap assembly 60, cap assembly 60 may be extremely difficult to remove from wheel 20 when wheel 20 is attached to a motor vehicle. This difficulty in removing cap assembly 60 may prevent or minimize theft of cap assembly 60, as well as prevent or minimize the risk of cap assembly 60 disengaging from wheel 20 during operation of the motor vehicle. To remove wheel cap assembly 60 when cap assembly 60 covers the center hole (i.e., aperture 18) of wheel 20, wheel 20 may be removed from the motor vehicle so that cylindrical portion 66 and tab 86 may be reached. Wheel cap assembly 60 may then be forced out from wheel 20.

To remove cap assembly 60 when cap assembly 60 hides the lug nuts (not shown) used to attach wheel 20 to a motor vehicle (i.e., when lug nuts are disposed within aperture 18), Then, a tool such as a screwdriver or some other type of device may be used to force cylindrical portion 66 away from flange portion 84. Once cylindrical portion 66 is forced away from flange portion 84, flange portion 84 may return to an angled position such that tab 86 disengages from sidewall 52. Cap assembly 60 may then be removed from wheel 20.

Although not illustrated in the figures, it should be understood that an outer surface 86 of cap member 62 may be provided with a design, emblem, or logo that may be integral with cap member 62. Alternatively, outer surface 98 may be provided with a recess that enables a design, emblem, or logo to be secured or fastened to cap member 62.

The description of the present teachings is merely exemplary in nature and, thus, variations that do not depart from the gist of the present teachings are intended to be within the scope of the present teachings. Such variations are not to be regarded as a departure from the spirit and scope of the present teachings.

What is claimed is:

1. A cap assembly for a wheel, comprising:
   a cap member having an axially extending cylindrical portion and at least one ridge that extends radially outward from said cylindrical portion; and
   a retainer ring having a plurality of axially extending flange portions slidably coupled to said cap member, said axially extending flange portions angled relative to a position normal said ring,
   wherein when the cap assembly is inserted into the wheel, said retainer ring slides along said cap member and said ridge forces said axially extending flange portions to said position normal said ring to attach said flange portions to the wheel; and
   said cylindrical portion includes a guide member, and said retainer ring includes a slot corresponding to said guide member.

2. The cap assembly of claim 1, wherein said flange portions include a tab including a first contour, said first contour engaging the wheel.

3. The cap assembly of claim 2, wherein said tab includes a second contour and said ridge includes a lip, said second contour engaging said lip.

4. The cap assembly of claim 1, wherein said flange portions include a tab having a contour and said ridge includes a lip, said contour corresponding to said lip.

5. The cap assembly of claim 1, wherein said axially extending flange portions are disposed at 120 degree intervals around said ring.

6. The cap assembly of claim, wherein said cap member includes a plurality of ridges extending radially outward from said cylindrical portion, said ridges disposed at 120 degree intervals around said cylindrical portion.

7. A cap assembly for a wheel, comprising:
   a cap member having an axially extending cylindrical portion and a plurality of ridges that extend radially outward from said cylindrical portion disposed around a circumference thereof; and
   a retainer ring having a plurality of axially extending flange portions disposed around a circumference thereof, said retainer ring slidably coupled to said cap member, said axially extending flange portions are angled relative to a position normal said ring, and said plurality of axially extending flange portions corresponding to said plurality of ridges,
   wherein when the cap assembly is inserted into the wheel, said retainer ring slides along said cap member and said ridges force said axially extending flange portions to said position normal said ring to attach said flange portions to the wheel; and
   said cylindrical portion includes at least one guide member, and said retainer ring includes at least one slot corresponding to said guide member.

8. The cap assembly of claim 7, wherein said flange portions include a tab including a first contour, said first contour engaging the wheel.

9. The cap assembly of claim 8, wherein said tab includes a second contour and each of said ridges include a lip, said second contour engaging said lip.

10. The cap assembly of claim 7, wherein said flange portions include a tab having a contour and said ridge includes a lip, said contour corresponding to said lip.

11. The cap assembly of claim 7, wherein said axially extending flange portions are disposed at 120 degree intervals around said circumference of said ring.

12. The cap assembly of claim 7, wherein said ridges are disposed at 120 degree intervals around said circumference of said cap member.

13. A cap assembly for insertion into an aperture of a wheel defined by sidewalls of the wheel, the cap assembly comprising:
   a cup-shaped cap member having a plurality of ridges that project radially outwardly disposed around a circumference thereof; and
   a retainer ring having a plurality of axially extending flange portions disposed around a circumference thereof, said retainer ring slidably coupled to said cup-shaped member, said axially extending flange portions are angled relative to a position normal said ring, and said plurality of axially extending flange portions corresponding to said plurality of ridges, wherein when the cap assembly is inserted into the aperture, said retainer ring slides along said cup-shaped member and said ridges force said axially extending flange portions to said position normal said ring to attach said flange portions to the sidewalls of the aperture; and said cup-shaped member includes at least one guide member, and said retainer ring includes at least one slot corresponding to said guide member.

14. The cap assembly of claim 13, wherein said flange portions include a tab including a first contour, said first contour engaging the sidewalls.

15. The cap assembly of claim 14, wherein said tab includes a second contour and said ridges each include a lip, said second contour engaging said lip.

16. The cap assembly of claim 14, wherein engagement of said tab including said first contour to the sidewalls radially locks the cap assembly to the wheel.

* * * * *